(12) United States Patent
Badolato Martin (10) Patent No.: US 11,814,089 B2
(45) Date of Patent: Nov. 14, 2023

(54) ENCODED INFORMATION MEANS LOCATED ON AN INFRASTRUCTURE TO BE DECODED BY SENSORS LOCATED ON MOBILES

(71) Applicant: AUTO DRIVE SOLUTIONS S.L., Madrid (ES)

(72) Inventor: Alejandro Badolato Martin, Moralzarzal (ES)

(73) Assignee: AUTO DRIVE SOLUTIONS S.L., Madrid (ES)

( * ) Notice: Subject to any disclaimer, the term of this patent is extended or adjusted under 35 U.S.C. 154(b) by 1203 days.

(21) Appl. No.: 15/504,329

(22) PCT Filed: Mar. 2, 2016

(86) PCT No.: PCT/IB2016/051159
§ 371 (c)(1),
(2) Date: Feb. 16, 2017

(87) PCT Pub. No.: WO2017/149357
PCT Pub. Date: Sep. 8, 2017

(65) Prior Publication Data
US 2020/0385037 A1 Dec. 10, 2020

(51) Int. Cl.
*B61L 25/02* (2006.01)
*E01B 1/00* (2006.01)
(Continued)

(52) U.S. Cl.
CPC .......... *B61L 25/025* (2013.01); *E01B 1/002* (2013.01); *E01B 3/00* (2013.01); *G01S 13/751* (2013.01);
(Continued)

(58) Field of Classification Search
CPC ...... B61L 25/025; G01S 13/751; G01S 15/74; G01S 17/74; G01S 7/032; G01S 7/481;
(Continued)

(56) References Cited

U.S. PATENT DOCUMENTS 5,318,143 A * 6/1994 Parker ................. E01F 9/30
180/170
2010/0026562 A1* 2/2010 Hyodo ................. B61L 25/025
342/189

(Continued)

FOREIGN PATENT DOCUMENTS

JP 2008056179 A * 3/2008

*Primary Examiner* — Bernarr E Gregory
*Assistant Examiner* — Juliana Cross
(74) *Attorney, Agent, or Firm* — ASLAN LAW, P.C.

(57) ABSTRACT

Encoded information means located on an infrastructure to be decoded by sensors located on mobiles, in such a way that these means encode the position they occupy in the infrastructure and allow for a mobile travelling along the same trajectory, provided with the adequate sensor, to read, decode and transform it immediately into information on its exact position in the infrastructure and being characterised by the fact that along the same trajectory described by a mobile it is possible to encode information in the infrastructure by means of different objects presenting dielectric change boundaries or dielectric/metal boundaries at different heights or distances regarding the origin of the onboard sensor, these boundaries being interrogated by a sensor on board the mobile by means of pressure or electromagnetic waves and by measuring the time the waves take to return to the sensor, making it possible to determine the distance at which the reflections occur and in this way to extract the information.

12 Claims, 4 Drawing Sheets

(51) Int. Cl.
*E01B 3/00* (2006.01)
*G01S 13/75* (2006.01)
*G01S 15/74* (2006.01)
*G01S 17/74* (2006.01)
*G06K 19/06* (2006.01)

(52) U.S. Cl.
CPC .............. *G01S 15/74* (2013.01); *G01S 17/74* (2013.01); *G06K 19/06* (2013.01)

(58) Field of Classification Search
CPC .......... G01S 7/521; G01S 13/04; G01S 13/88; G01S 13/89; G01S 17/66; G01S 17/87; G01S 17/88; G01S 7/41; G01S 7/412; G06K 19/06; G01B 11/14
See application file for complete search history.

(56) References Cited

U.S. PATENT DOCUMENTS

2010/0131185 A1* 5/2010 Morris .................... G01C 15/00
701/19
2014/0368837 A1* 12/2014 Kang ...................... G01B 11/14
356/614
2015/0379314 A1* 12/2015 Schreiber ................ G01S 13/89
235/494

* cited by examiner

ENCODED INFORMATION MEANS LOCATED ON AN INFRASTRUCTURE TO BE DECODED BY SENSORS LOCATED ON MOBILES

CROSS-REFERENCE TO RELATED APPLICATIONS

Not Applicable

STATEMENT REGARDING FEDERALLY SPONSORED RESEARCH OR DEVELOPMENT

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT INCORPORATION-BY-REFERENCE OF MATERIAL SUBMITTED ON A COMPACT DISC

Not Applicable

BACKGROUND OF THE INVENTION
TECHNICAL FIELD

Field of the Invention

The field of the invention is that of the automotive auxiliary industry, the railway industry and the electronic industry.

Description of Related Art

A background does exist regarding devices performing the same function of encoded information which can be located on an infrastructure.

From among these the inventor is similarly the inventor of international patent PCT/ES2015/070378 in which the encoding means is described as a guide rail installed flush with the surface of the road although it can optionally be hidden under a layer of tarmac treated with a layer of hydrophobic material with preferred dimensions of 1.5 cm wide and 5 cm deep and where the internal part has machined cavities, with the preferred shape of the cavities being that of dihedrons as the planes of dihedrons increase the signal reflected therefore enabling their detection.

This device is efficient for some infrastructures, but it does not allow for exploiting all the possibilities offered by the system, for which reason the invention proposed presents other new means adapted very particularly to all types of infrastructures in existence while also offering more simple means, for example discontinuous and economic, for example paint marks, to encode the information.

On the part of the inventor no antecedent is known to include the provisions presented by this invention, or the advantages such provision implies.

BRIEF SUMMARY OF THE INVENTION

The invention proposed refers to encoded information means located on an infrastructure to be decoded by sensors located on mobiles, in such a way that these means encode the position they occupy in the infrastructure and allow for a mobile travelling along the same trajectory, provided with the adequate sensor, to read, decode and transform it immediately into information on its exact position in the infrastructure.

These encoded information means allow for their use, among others, in automatic guiding systems on all types of mobile travelling along infrastructures, such as automobile vehicles, railway vehicles or even river vehicles.

BRIEF DESCRIPTION OF THE DRAWINGS

For a better understanding of the invention two pages of diagrams are attached showing the following.

DETAILED DESCRIPTION OF THE INVENTION

The invention proposed refers to encoded information means located on an infrastructure to be decoded by sensors located on mobiles, in such a way that these means encode the position they occupy in the infrastructure and allow for a mobile travelling along the same trajectory, provided with the adequate sensor, to read, decode and transform it immediately into information on its exact position in the infrastructure.

Among others, these encoded information means allow for their use in automatic guiding systems on all types of mobile travelling along infrastructures, such as automobile vehicles, railway vehicles or even river vehicles.

The information is given by means of the detection of changes in the dielectric properties of the means located in an infrastructure, in which the dielectric changes are detected by means of sensors such as a high resolution radar device or another similar detector.

Throughout the trajectory described by a mobile it is possible to encode information in the infrastructure by means of different objects presenting dielectric change boundaries or dielectric/metal boundaries at different heights or distances regarding the origin of the onboard sensor.

These boundaries are interrogated by a sensor on board the mobile by means of pressure or electromagnetic waves and by measuring the time the waves take to return to the sensor, it is possible to determine the distance at which the reflections occur and in this way to extract the information.

The following can be distinguished within the different means:

An information means of these characteristics refers to the information given by the railway sleepers as these present several unique characteristics:

a uniform surface with regard to the ballast, or a different height regarding the track set on a concrete slab The sleepers are always found at a specific distance from a known point on the locomotive(s) or one of the wagons (coaches).

Moreover, these sleepers can be encoded with a series of bits by means of a series of studs of different heights, with the sleeper being encoded by means of a series of studs which offer a series of levels and these studs being covered with a material permeable to the waves and of a known thickness.

The information on the position is divided into 4-bit groups which are encoded successively at each sleeper by means of the levels.

When 2 consecutive bits of the same level are encoded, a third level of a different height is used to encode this second repeated bit.

This technique allows for the sensor to identify both bits and to determine that the second bit has the same logical level as the previous one.

By alternatively using the repetition level it is possible to identify consecutive 4-bit strings with the same logical level.

A fourth height level is always used as the fifth bit.

In this way the sensor is capable of knowing the reading direction.

If the first detection matches the fourth level the sensor will detect that it is reading the bits in reverse order.

4 bits of information obtain 24=16 different sleepers each encoding 5 bits (4 of information and 1 indicating the reading direction).

A seventeenth sleeper model characteristic for its first bit starting with a repetition bit and its fifth bit indicating the reading direction is used to indicate the start or end of a word made up by 4-bit groups.

In this way, a word start sleeper and 8 more sleepers of information encode 232 possible combinations that can be uniquely assigned to the segment occupied by the 9 sleepers.

The information is encoded redundantly in two different places for two sensors to be able to read the information means simultaneously.

The sensor interrogates the infrastructure with a spot 8 mm in diameter and in order for each stud to be illuminated correctly by the sensor, the surface area of the studs is 1 cm2, with the height separation of each stud associated with a different logical level being 0.5 cm.

These studs are covered with a material (2) permeable to waves of a known thickness and has two functions: on the one hand to avoid any material from being deposited between the studs and also to serve as reference to determine the different logical levels.

The locomotive or coach can vary its height due to the action of the suspension but, given that the sensor detects a reflection in the boundary between the permeable material and the air, this can determine the location of the different logical levels independently from the distance of the locomotive to the ground.

Another information means is also a sleeper but one in which the information is encoded by slits instead of studs in such a way the sleeper shows no relief on its upper surface.

The stud or slit techniques described may also be used on tracks set on a concrete slab.

Another information means are encoded blocks but ones that are installed on the sides or the upper part of the trajectory (for example on the catenary, on the arch of a station or tunnel, etc.) turned round appropriately for their encoded part to face the sensor and arranged at a certain height in such a way there is direct view between the sensor and the block even under snow conditions.

The boundary surfaces can form trihedrons to maximise reflection.

If the information is required for land infrastructures and more specifically roads a sequence of specks/lines of paint or another material is foreseen preferably in colour black so as not to confuse drivers.

The specks present different thicknesses with 2 mm separations between boundaries and are stuck longitudinally on the road in the centre/lane.

These specks each have a surface area of 1 cm2 and present an upper coating of another permeable material with hydrophobic properties which serves as a reference point for the sensor.

The information is also encoded by means of different levels with 3 mm separations and in 4-bit groups plus a fifth bit indicating the reading direction.

Between the 5-bit blocks there is a free uncoded space for the water to follow the slope marked by the camber of the road so it does not accumulate next to the information means.

Accompanying the sequence of specks, 2 side bands of different thicknesses serve to encode the lateral drift of the sensor with regard to the information means where the information is encoded.

Another information means is made up by a strip with slits of different depths, preferably out of plastic and with each centimetre encoded.

This strip, among other applications, serves to inform on the advance and the position to a mobile in such a way this can apply controlled accelerations and decelerations thus enabling the mobile to stop precisely.

An example could be the train stopping at a station.

Another way of encoding information consists in using objects (continuous or discontinuous) of the same thickness and permeable to the waves with different transmission properties with regard to propagation speed.

In the case of electromagnetic waves, a different dielectric constant will delay more or less the detection associated with the second dielectric change boundary (back surface of the object).

Another information means is characterised for having the covered surface made up by materials in which the wave propagation speed is different.

This fact causes (when considering a constant propagation speed) the detections of upper boundaries to be distanced in a different manner from the detections of the rear boundaries.

Another information means is characterised for having the coating made up by materials in which wave propagation speed is different and due to which, when considering a constant propagation speed, there is a difference between the detection of the boundaries. such blocks and the corresponding lower ones are different, causing the detection of the upper boundaries to be different from the detection of the lower boundaries according to the material used.

A solution is proposed making it possible to read encoded information on a non-conductive material by means of the existence or not of dielectric constant change boundaries in the middle that can be detected by means of sensors installed on mobiles.

The dielectric change boundaries in a non-conductive material lead to part of the energy irradiated towards the material in question to be reflected.

This reflected energy is detected by the associated sensor making it possible to determine the radial distance at which the discontinuity is found.

The dielectric change boundaries can be obtained by using two materials or substances whose dielectric constants are different or using a single material in which the boundary is established between the material and the vacuum or the material or a gas or substance.

Description of the Preferred Embodiment

The invention proposed refers to encoded information means located on an infrastructure to be decoded by sensors located on mobiles, in such a way that these means encode the position they occupy in the infrastructure and allow for a mobile travelling along the same trajectory, provided with the adequate sensor, to read, decode and transform it immediately into information on its exact position in the infrastructure.

These encoded information means allow for their use, among others, in automatic guiding systems on all types of mobile travelling along infrastructures, such as automobile vehicles, railway vehicles or even river vehicles.

The information is given by means of the detection of changes in the dielectric properties of the means located in an infrastructure, in which the dielectric changes are detected by means of sensors such as a high resolution radar device or another similar detector.

Throughout the trajectory described by a mobile it is possible to encode information in the infrastructure by means of different objects presenting dielectric change boundaries or dielectric/metal boundaries at different heights or distances regarding the origin of the onboard sensor.

These boundaries are interrogated by a sensor on board the mobile by means of pressure or electromagnetic waves and by measuring the time the waves take to return to the sensor, it is possible to determine the distance at which the reflections occur and in this way to extract the information.

The following can be distinguished within the different means:

A) An information means of these characteristics which we will call type a) refers to the information given by the railway sleepers (T) as these present several unique characteristics:
 a uniform surface with regard to the ballast, or
 a different height regarding the track set on a concrete slab The sleepers (T) are found at a specific distance from a known point on the locomotive(s) or one of the wagons (coaches).

Figure 1:
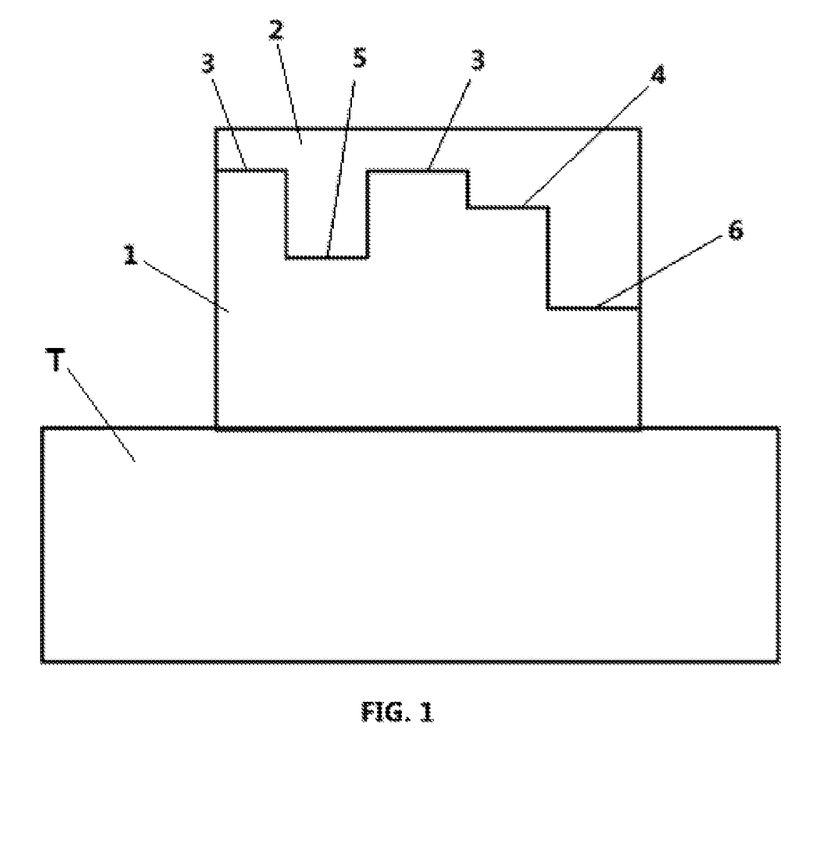
FIG. 1. Representing a side view (view perpendicular to the trajectory of the tracks and parallel to the ground) of a sleeper (T) and the encoding means.

Moreover, these sleepers can be encoded with a series of bits by means of a series of studs of different heights, as shown in FIG. 1.

The encoding of the sleeper (T) is performed by means of a series of studs which offer a series of levels (3), (4), (5) and (6) and these studs are covered with a material (2) permeable to the waves and of a known thickness.

The information on the position is divided into 4-bit groups which are encoded successively at each sleeper by means of the levels (3 and 4).

When 2 consecutive bits of the same level are encoded, a third level of a different height (5) is used to encode this second repeated bit.

This technique allows for the sensor to identify both bits and to determine that the second bit has the same logical level as the previous one.

By alternatively using the repetition level it is possible to identify consecutive 4-bit strings with the same logical level.

A fourth height level (6) is always used as the fifth bit.

In this way the sensor is capable of knowing the reading direction.

If the first detection matches the fourth level the sensor will detect that it is reading the bits in reverse order.

4 bits of information obtain 24=16 different sleepers each encoding 5 bits (4 of information and 1 indicating the reading direction).

A seventeenth sleeper model characteristic for its first bit starting with a repetition bit (5) and its fifth bit indicating the reading direction (6) is used to indicate the start or end of a word made up by 4-bit groups.

In this way, a word start sleeper and 8 more sleepers of information encode 232 possible combinations that can be uniquely assigned to the segment occupied by the 9 sleepers.

The information is encoded redundantly in two different places for two sensors to be able to read the information means simultaneously.

The sensor interrogates the infrastructure with a spot 8 mm in diameter.

In order for each stud to be illuminated correctly by the sensor, the surface area of the studs is 1 cm2.

The height separation of each stud associated with a different logical level is 0.5 cm.

These studs are covered with a material (2) permeable to waves of known thickness.

This coating has two functions:

On the one hand to avoid any material from being deposited between the studs and also to serve as reference to determine the different logical levels.

The locomotive or coach can vary its height due to the action of the suspension but, given that the sensor detects a reflection in the boundary between the permeable material and the air, this can determine the location of the different logical levels independently from the distance of the locomotive to the ground.

B) Another information means we will call type b) is a sleeper in which the information is encoded by slits instead of studs in such a way the sleeper shows no relief on its upper surface.

C) Another information means we will call type c) consists in using the stud or slit techniques on tracks set on a concrete slab.

D) Another information means we will call type d) refers to blocks encoded in an analogous manner to type a) only installed on the sides or the upper part of the trajectory (for example on the catenary, on the arch of a station or tunnel, etc.) turned round appropriately for their encoded part to face the sensor and arranged at a certain height in such a way there is direct view between the sensor and the block even under snow conditions.

The boundary surfaces can form trihedrons to maximise reflection.

E) Another information means we call type e) is an information means similar to type a) only to be used on roads instead of sleepers.

In this case the studs are a sequence of specks/lines of paint or another material is foreseen preferably in colour black so as not to confuse drivers.

The specks present different thicknesses with 2 mm separations between boundaries and are stuck longitudinally on the road in the centre/lane.

Figure 2:
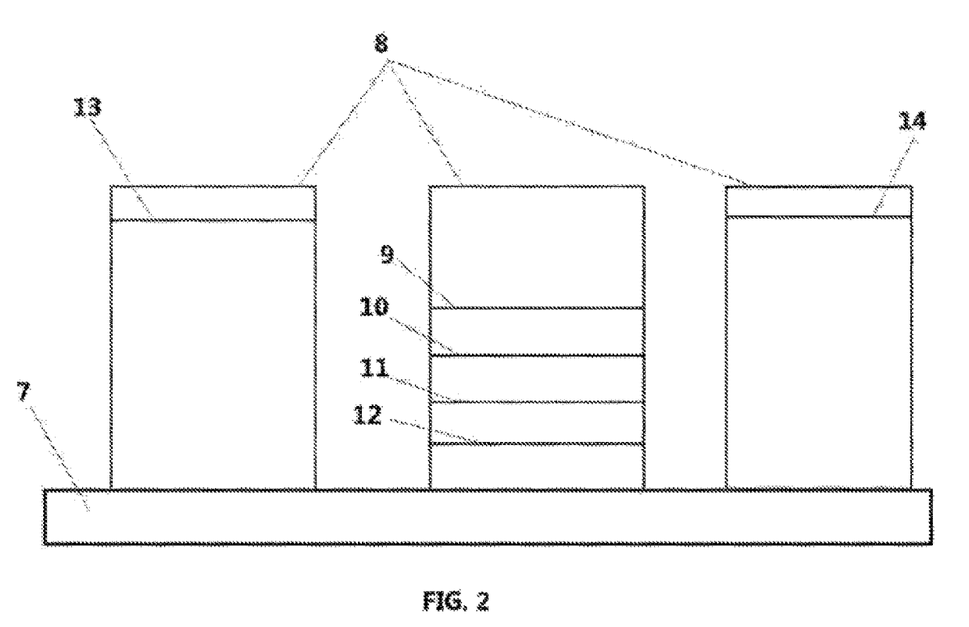
FIG. 2. Representing a side view of the cross-section perpendicular to the axis of the wearing course of a land infrastructure and with the encoding means in blocks.

FIG. 2 shows a cross section of the wearing course of the road (7) and one of the specks.

These specks each have a surface area of 1 cm2 and present an upper coating of another permeable material with hydrophobic properties which serves as a reference point for the sensor.

The information is also encoded by means of 3 different levels (9-11) with 3 mm separations and in groups plus a fifth bit (12) indicating the reading direction.

Between the 5-bit blocks there is a free uncoded space for the water to follow the slope marked by the camber of the road so it does not accumulate next to the information means.

Accompanying the sequence of specks, 2 side bands (13,14) of different thicknesses serve to encode the lateral drift of the sensor with regard to the information means where the information is encoded.

F) Another information means called type f) is made up by a strip with slits of different depths (with the levels defined in type a), preferably out of plastic and with each centimetre encoded.

This strip, among other applications, serves to inform on the advance and the position to a mobile in such a way this can apply controlled accelerations and decelerations thus enabling the mobile to stop precisely.

An example could be the train stopping at a station.

G) Another way of encoding information we call type g) consists in using objects (continuous or discontinuous) of the same thickness and permeable to the waves with different transmission properties with regard to propagation speed.

In the case of electromagnetic waves, a different dielectric constant will delay more or less the detection associated with the second dielectric change boundary (back surface of the object).

Figure 3:
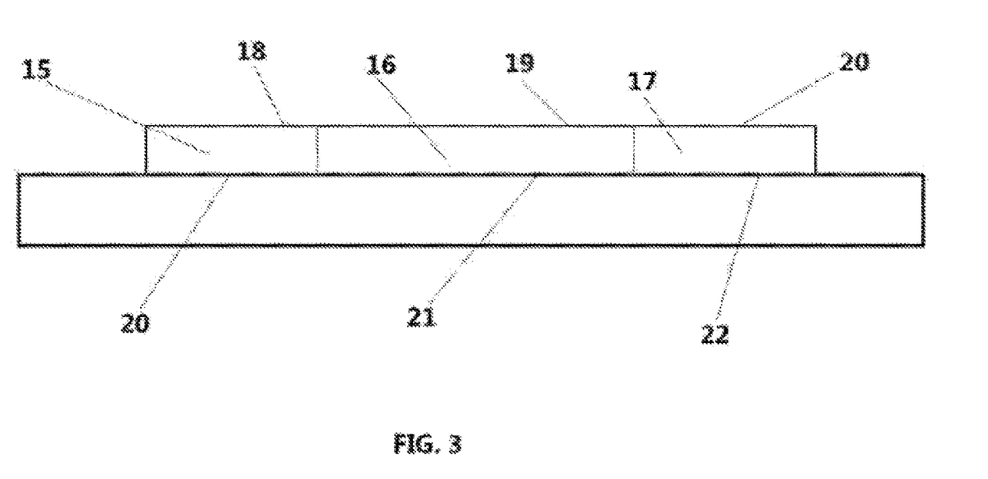
FIG. 3. Representing a side view of the cross-section perpendicular to the axis of the wearing course of a land infrastructure and with the encoding means with a different material thickness.

H) Another way of encoding information we call type h), in accordance with FIG. 3 and consisting in the same means as type a) except for the fact the information is not located in the depth of the material used as coating (T) but because this coating is made up by materials (15), (16) and (17) in which the wave propagation speed is different.

This fact causes (when considering a constant propagation speed) the detections of boundaries (18), (19) and (20) to be distanced in a different manner from the detections of boundaries (20), (21) and (22).

Figure 4:
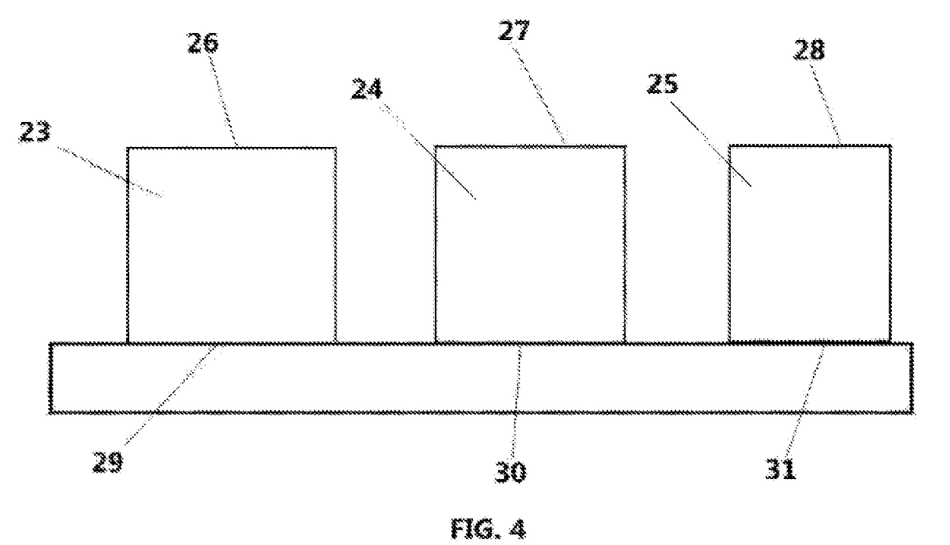
FIG. 4. Representing a side view of the cross-section perpendicular to the axis of the wearing course of a land infrastructure and with the encoding means in blocks having different propagation speeds.

J) Another information means we call type j) is the same as that defined as type e) except for the fact the information is not located in the thickness of the coating (8) but because this coating (24), and this coating is made up by materials in which the wave propagation speed is different, therefore considering a constant propagation speed there is a difference between the detection of boundaries.

If we consider three blocks that are parallel to each other and perpendicular to the movement axis of the mobile, (85), (86) and (87) then the position difference between the upper boundaries of such blocks, (26), (27) and (28) and the corresponding lower ones (29), (30) and (31) causes the detection of the upper boundaries to be different from the detection of the lower boundaries according to the material used.

A solution is proposed making it possible to read encoded information on a non-conductive material by means of the existence or not of dielectric constant change boundaries in the middle that can be detected by means of sensors installed on mobiles.

The dielectric change boundaries in a non-conductive material lead to part of the energy irradiated towards the material in question to be reflected.

This reflected energy is detected by the associated sensor making it possible to determine the radial distance at which the discontinuity is found.

The dielectric change boundaries can be obtained by using two materials or substances whose dielectric constants are different or using a single material where the boundary is established between the material and the vacuum or the material or a gas or substance.

Having described sufficiently the nature of the invention, together with the way of putting it into practice, it should be stated that the provisions indicated above and represented in the attached drawings are susceptible to detailed modifications as long as they do not alter its basic principles, established in the previous paragraphs and summarised in the following claims.

The invention claimed is:

1. A system comprising:
an encoded information means located along a trajectory on an infrastructure to be decoded by sensors located on mobile vehicles that travel along the trajectory, wherein
said encoded information means encodes the position the encoded information means occupies in the infrastructure;
at least one sensor, to read and decode the encoded information means into information on a position of a mobile vehicle in the infrastructure, wherein
said encoded information means, located along the trajectory of the mobile vehicles, comprising different objects presenting dielectric change boundaries or dielectric/metal boundaries that present different wave propagation times with respect to the at least one sensor on a first mobile vehicle of the mobile vehicles,
said at least one sensor on the first mobile vehicle is configured to interrogate said dielectric change boundaries or dielectric/metal boundaries via pressure or radar waves and to measure propagation times the pressure or radar waves take to return via reflections to the at least one sensor, and to determine the distances at which the reflections occur and to extract encoded information of said different objects that incorporate the encoded information of said encoded information means,
said infrastructure comprises a railway infrastructure including a plurality of railway sleepers, the encoded information means are made up by the railway sleepers themselves, the railway sleepers having a first characteristic, wherein
the first characteristic of the railway sleepers includes a uniform surface with regard to a ballast, or a different height with respect to a track set on a concrete slab, and wherein
the railway sleepers are found at a specific distance from a known point on a railway vehicle, the railway vehicle comprising a locomotive or a wagon or a coach, wherein
the plurality of sleepers are encoded with a series of bits via a plurality of studs, the studs covered with a material permeable to the eaves; wherein
at each stud of the plurality of studs, a respective thickness of the permeable material encodes a logical level of a bit representing or corresponding to the encoded information on the position the encoded information means occupies in the infrastructure, the information on the position being divided into groups of 4 bits according a coding scheme, the coding scheme comprising:
a 4-bit group encoded at each sleeper, wherein the logical level of zero of a bit and ones of bits are representable via first and second levels of thickness of the permeable material;

when the 4-bit group includes 2 consecutive bits of a same logical level of a but, the second consecutive bit is representable via a third level of thickness of the permeable material; and a fourth level of thickness of the permeable material, which is a fifth bit that indicates a reading direction for the 4-bit group to the at least one sensor, wherein said coding scheme uses 4 bits of information to indicate 16 different sleepers, each encoding its respective 4-bit group and its respective fifth bit according to the coding scheme.

2. The system according to claim 1, wherein distinct from said 16 different sleepers, a seventeenth sleeper encodes its respective 4-bit group via its first bit having the third level of thickness of the permeable material and its fifth bit indicating the reading direction for the seventeenth sleeper, the seventeenth sleeper indicating a start or an end of a word made up by a plurality of 4-bit groups.

3. The system according to claim 1, wherein the at least one sensor, on the first mobile vehicle of the mobile vehicles, comprises two sensors, the encoded information is implanted redundantly in two different places for the two sensors to simultaneously read the encoded information.

4. The system according to claim 1, wherein the encoded information means comprises a plurality of studs, each having a surface area, and the at least one sensor, on the first mobile vehicle of the mobile vehicles, is configured to interrogate the infrastructure with a spot 8 mm in diameter, with the surface area of the studs being 1 cm$^2$, a height separation of each stud associated with a different logical level of a bit being 0.5 cm, and the studs being covered with a material permeable to the waves.

5. The system according to claim 1, wherein the different objects that incorporate the encoded information are located on sides or an upper part along the trajectory, and are configured to face the at least one sensor.

6. The system according to claim 1, wherein said at least one sensor is a radar sensor for the radar waves.

7. The system according to claim 1, wherein the encoded information means comprises said plurality of studs on tracks set on a concrete slab.

8. A system comprising:

an encoded information means located along a trajectory on an infrastructure to be decoded by sensors located on mobile vehicles that travel along the trajectory, wherein said encoded information means encodes the position the encoded information means occupies the infrastructure;

at least one sensor, to read and decode the encoded information means into information on a position of a mobile vehicle in the infrastructure, wherein said encoded information means, located along the trajectory of the mobile vehicles, comprising different objects presenting dielectric change boundaries or dielectric/metal boundaries that present different wave propagation times with respect to the at least one sensor on a first mobile vehicle of the mobile vehicles, said at least one senor on the first mobile vehicle is configured to interrogate said dielectric change boundaries or dielectric/metal boundaries via pressure or radar waves and to measure propagation times the pressure or radar waves take to return via reflections occur and to extract encoded information of said different objects that incorporate the encoded information of said encoded information means, the different objects that incorporate the encoded information are made up by a sequence of specks or lines of a paintable material, the specks or lines have different thicknesses with 2 mm separations between their boundaries and are applied longitudinally on a surface of the infrastructure, each with a surface area of 1 cm$^2$ and comprising an upper coating of a permeable material with hydrophobic properties, the upper coating providing a reference point for the at least one sensor, for the at least one sensor, the encoded information is encoded via 3 different levels with 3 mm separations and in 5-bit blocks, each comprising a 4-bit group plus a fifth bit indicating a reading direction for its 4-bit group, the encoded information is encoded with an uncoded free space between the 5-bit blocks, and the encoded information is encoded with 2 side bands of different thicknesses to encode a lateral drift of the at least one sensor when the at least one sensor is laterally drifted with respect to the encoded information means.

9. The system according to claim 8, wherein the at least one sensor, on the first mobile vehicle of the mobile vehicles, comprises two sensors, the encoded information is implanted redundantly in two different places for the two sensors to simultaneously read the encoded information.

10. The system according to claim 8, wherein the encoded information means comprises a plurality of studs, each having a surface area, and the at least one sensor, on the first mobile vehicle of the mobile vehicles, is configured to interrogate the infrastructure with a spot 8 mm in diameter, with the surface area of the studs being 1 cm$^2$, a height separation of each stud associated with a different logical level of a bit being 0.5 cm, and the studs being covered with a material permeable to the waves.

11. The system according to claim 8, wherein the different objects that incorporate the encoded information are located on sides or an upper part along the trajectory, and are configured to face the at least one sensor.

12. The system according to claim 8, wherein said at least one sensor is a radar sensor for the radar waves.

* * * * *